United States Patent [19]

Feldt et al.

[11] Patent Number: 4,569,245

[45] Date of Patent: Feb. 11, 1986

[54] DROP-IN TYPE AUTOMOTIVE TRANSMISSION SHIFTER

[75] Inventors: Earl C. Feldt, Muskegon; Robert C. Angell, Grand Haven, both of Mich.

[73] Assignee: JSJ Corporation, Grand Haven, Mich.

[21] Appl. No.: 558,815

[22] Filed: Dec. 7, 1983

[51] Int. Cl.$^4$ ............................................. G05G 9/12
[52] U.S. Cl. .............................. 74/473 P; 74/473 R; 267/150; 267/162
[58] Field of Search .......................... 74/473 R, 473 P; 267/150, 161, 162; 200/153 K

[56] References Cited

U.S. PATENT DOCUMENTS

| | | | |
|---|---|---|---|
| 2,100,642 | 11/1937 | Geyer | 74/473 P |
| 3,483,888 | 12/1969 | Wurzel | 267/161 X |
| 4,269,081 | 5/1981 | Peterson et al. | 267/150 X |
| 4,333,360 | 6/1982 | Simmons | 74/473 P |

*Primary Examiner*—A. Michael Chambers
*Assistant Examiner*—John C. Fox
*Attorney, Agent, or Firm*—Price, Heneveld, Huizenga & Cooper

[57] ABSTRACT

A drop-in type shifter for an automotive transmission is provided that is spring biased with relatively flat washer-like springs. The shifter comprises an elongate shift stick having an upper end and a lower end. The upper end is manually actuable and the lower end is adapted for insertion in an automotive transmission for changing the drive ratio of the transmission when the shift stick is pivoted. A base is provided for mounting the shifter on the transmission and a spherical socket is disposed on the base. A spherical ball is disposed on the shift stick between the upper and lower ends of the shift stick and the ball is received in the spherical socket for pivotally mounting the shift stick on the base. A channel is provided which bisects the socket. The ball is provided with a rocking shaft having first and second ends disposed on adjacent sides of the ball and extending into the channel for stabilizing the pivotable shift stick for pivotable movement about first and second orthogonal axes. At least one relatively flat washer-like spring is provided having a central opening through which the upper end of the shift stick extends. The washer-like spring is provided with a generally curvilinear cross section and a top plate is provided for compressing the washer-like spring against the first and second ends of the rocking shaft for spring biasing the shift stick in an upright fashion.

27 Claims, 18 Drawing Figures

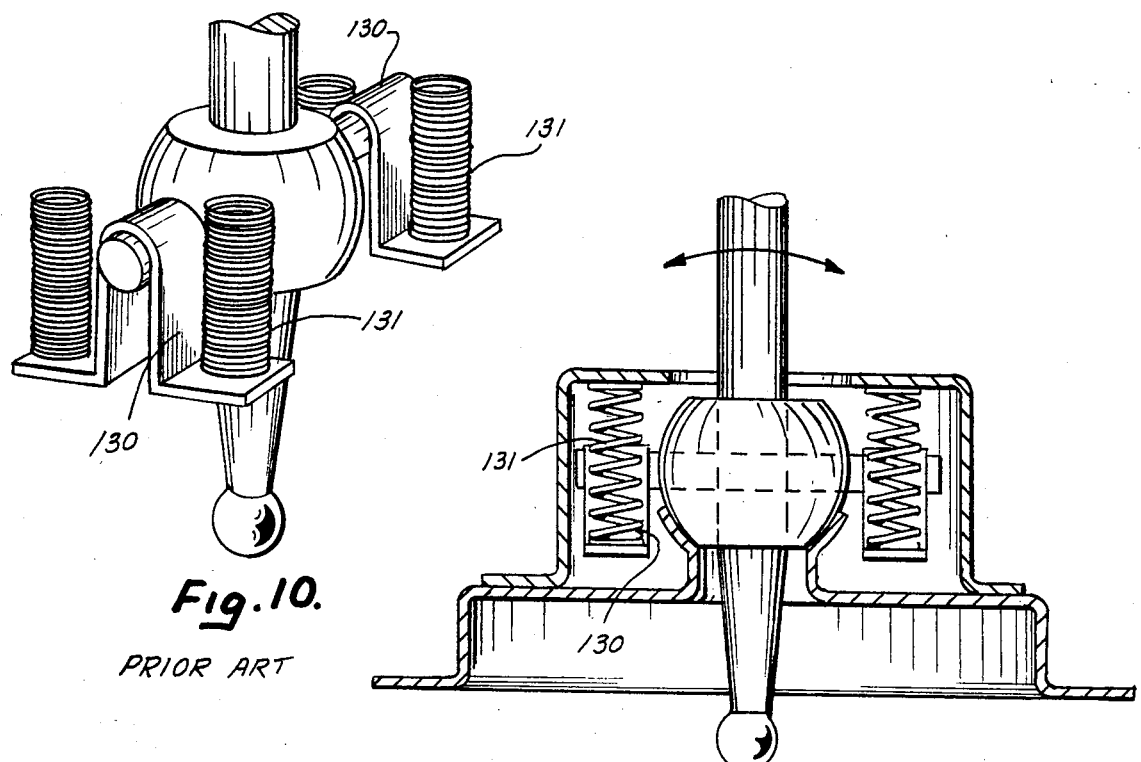
Fig.10. PRIOR ART
Fig.11. PRIOR ART
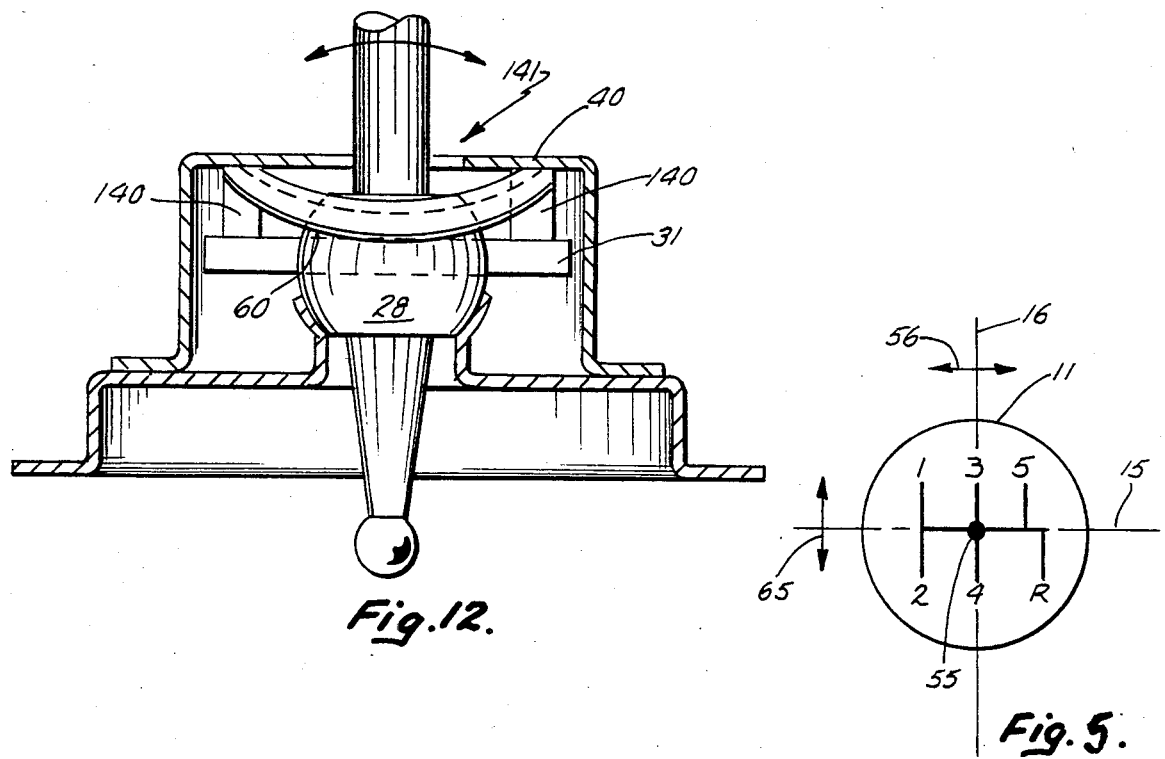
Fig.12.
Fig.5.

DROP-IN TYPE AUTOMOTIVE TRANSMISSION SHIFTER

BACKGROUND OF THE INVENTION

This invention relates generally to shifters for automotive transmissions and, more particularly, is directed to a drop-in type automotive transmission shifter which is spring biased into the neutral position with one or more flat springs.

Drop-in type shifters are well-known in the prior art. These shifters normally comprise a shift stick means for pivotally mounting the shift stick about a base, and a gear actuating lever which extends from the bottom of the base and into the transmission for changing the drive ratio of the transmission when the shift stick is manually pivoted. Often the means for pivotally mounting the shift stick comprises a ball and socket connection. The shifter is normally secured to the top of a transmission with bolts entering through the base of the shifter. The base is usually bolted over an aperture in the top of the transmission and the shift lever extends downwardly from the base through the aperture into the transmission. Hence, these types of shifters have been referred to as drop-in type shifters.

It has often been considered desirable to spring bias an automotive transmission shifter into a neutral position or neutral plane. In the case of a conventional manual automotive transmission having an H-shaped shift pattern implemented with a shift stick which is pivotable about first and second orthogonal axes, it has also been thought to be desirable to provide a differential spring bias which may, for example, be used to inhibit positioning the shifter in one or more gear positions such as the reverse gear position. Prior art attempts at achieving the aforementioned spring biasing characteristics in drop-in type shifters have employed the use of a plurality of coil-type springs for spring biasing the shifter. The coil springs are used to suspend a pair of yokes which encompass opposing ends of a rocking shaft that extends through the ball and socket of the shifter. These springs act in tension and compression to spring bias the shifter in an upright position and may be provided with different spring constants to effect a differential spring bias. The disadvantage of this prior art approach to spring biasing a drop-in type shifter is related to the expense of manufacturing such a shifter. Not only are the components somewhat expensive, but assembly techniques have proven to be time consuming.

SUMMARY OF THE INVENTION

These and other problems in the prior art are solved by provision of a drop-in type shifter for an automotive transmission which employs one or more washer-like flat springs for spring biasing a shift stick. An elongate, pivotable shift stick is provided, the upper end of the shift stick being manually actuable and the lower end of the shift stick being provided with a lever which is adapted for insertion into an automotive transmission for changing the drive ratio of the transmission when the shift stick is pivoted. A base is provided which is adapted for mounting the shifter on the transmission and a spherical socket is disposed on the base. The spherical socket is provided with an aperture disposed on the bottom of the socket for receiving the shift lever disposed on the lower end of the shift stick. A spherical ball is disposed on the shift stick above the shift lever, the ball and the lever being received in the socket for pivotally mounting the shift stick on the base. A channel is provided which bisects the socket and a rocking shaft is disposed on the ball, the rocking shaft having first and second ends which project into the channel for stabilizing the pivotable shift stick for pivotal movement about first and second orthogonal axes. One or more relatively flat, washer-like springs having a central opening through which the upper end of the shift stick extends are disposed above the ball and rocking shaft. The springs are provided with a generally curvilinear cross section and a top plate is provided for compressing the washer-like springs against the first and second ends of the rocking shaft for spring biasing the shift stick in an upright fashion. According to a more narrow aspect of the invention, different portions of the flat springs are provided with different material dimensions to provide for a differential spring bias. This structure is considerably less complex than those prior art spring biasing structures employing coil springs, and lends itself to a less complex assembly procedure.

BRIEF DESCRIPTION OF THE DRAWINGS

FIG. 5 is a schematic representation of the pivotal movements of the shift stick 11 and how they result in changes in the drive ratio of a manual automotive transmission having a conventional H-shaped pattern.

FIG. 10 is a perspective view of a prior art arrangement for spring biasing drop-in type shifters.

FIG. 11 is a side elevational view, partially in section, of the prior art drop-in type shifter illustrated in FIG. 10.

FIG. 12 is a side elevational view, partially in section, of an alternative embodiment of the drop-in type shifter of the present invention.

DESCRIPTION OF THE PREFERRED EMBODIMENTS

Figure 7:
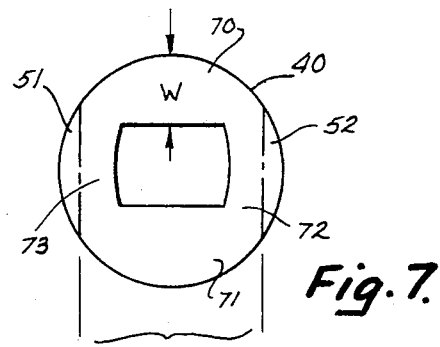
FIG. 7 is a top view of the spring illustrated in FIG. 6.
Figure 6:
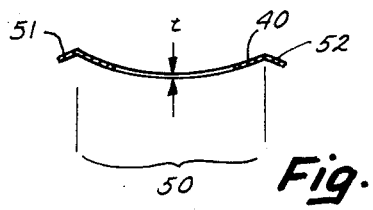
FIG. 6 is a side view, taken in section, of one of the relatively flat washer-like springs comprising a portion of the shifter illustrated in FIGS. 1 through 5.
Figure 8:
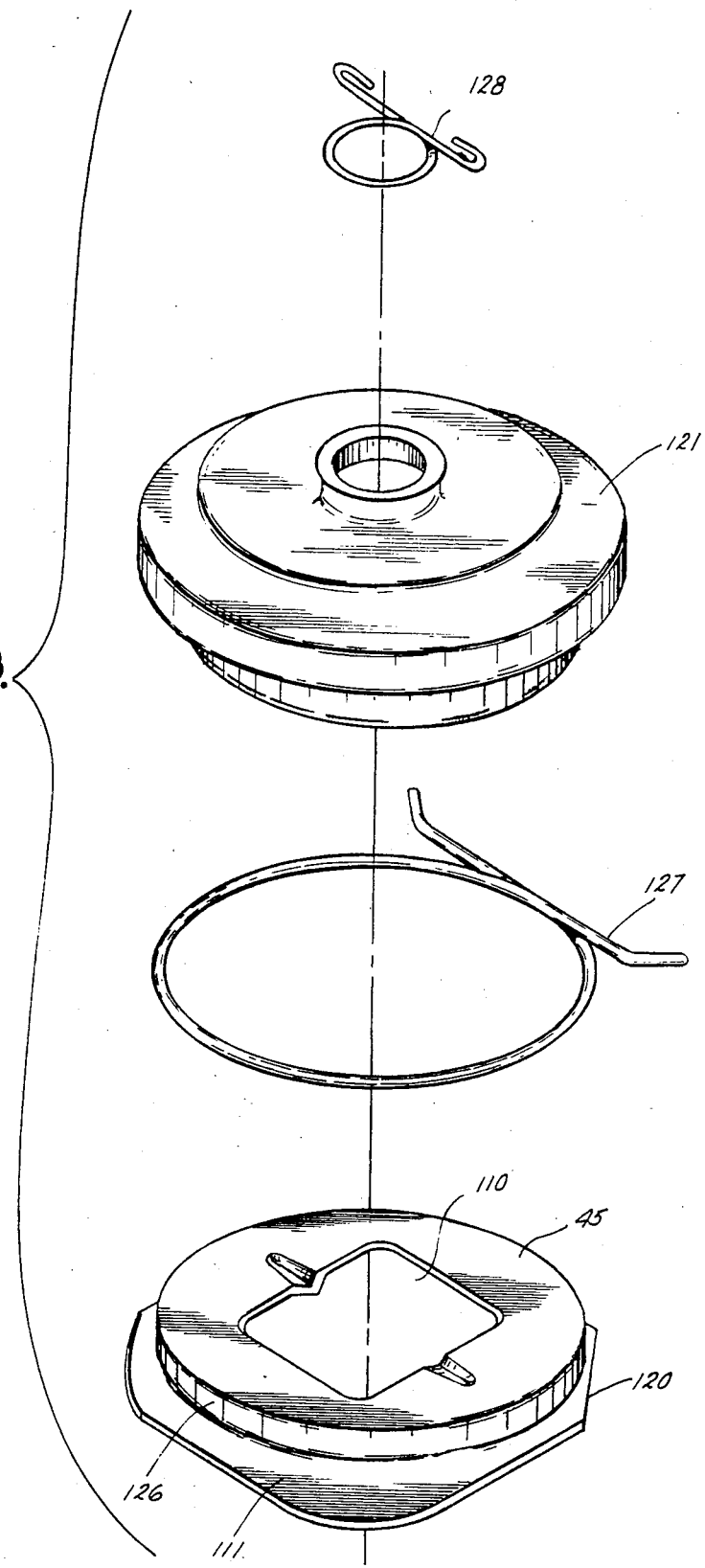
FIG. 8 is an exploded assembly of a top plate and dust cover comprising a portion of the shifter illustrated in FIGS. 1 through 7.
Figure 9:
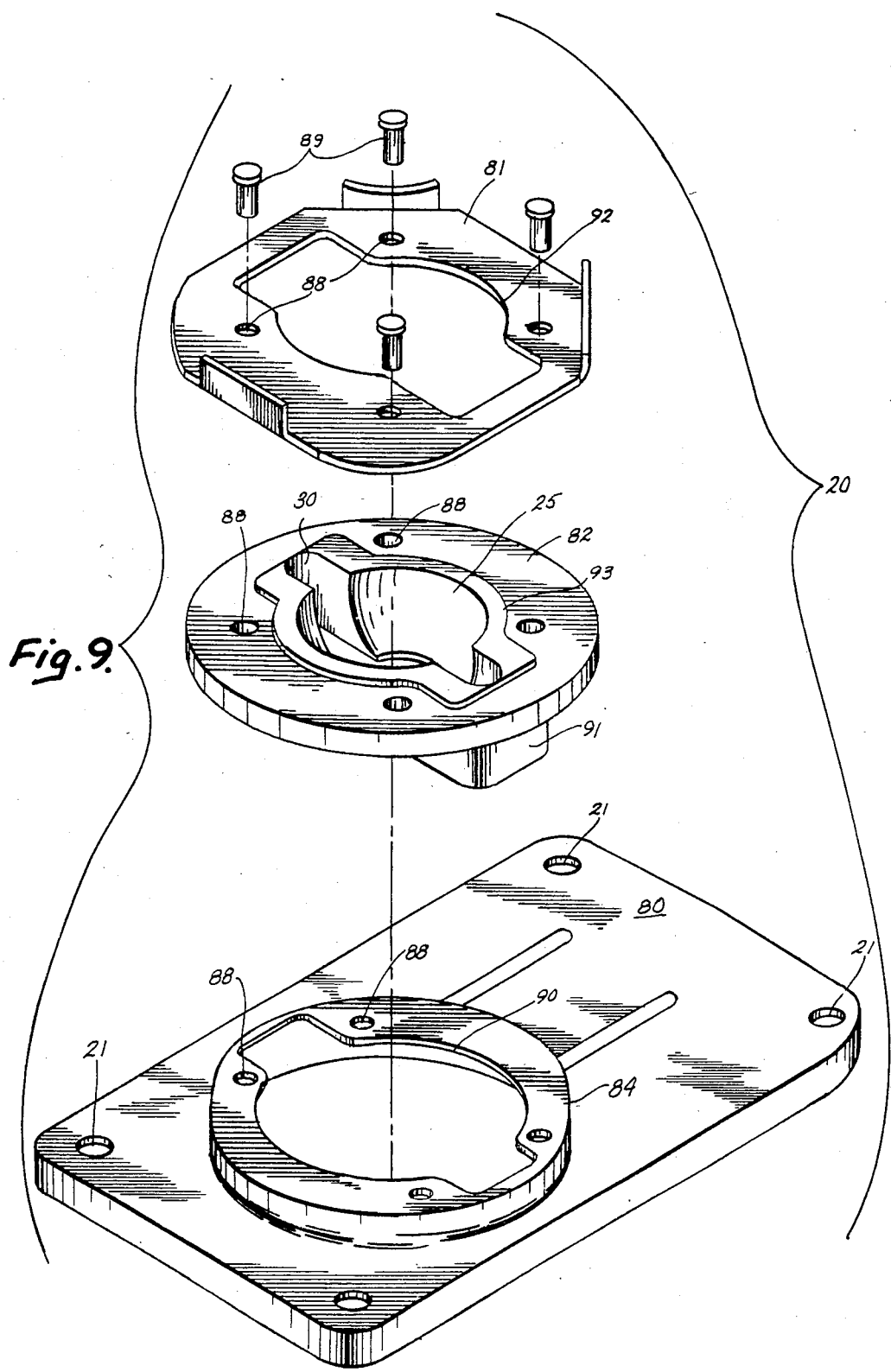
FIG. 9 is an exploded assembly of the base subassembly comprising a portion of the shifter illustrated in FIGS. 1 through 8.

With reference now to FIGS. 1 through 9, a preferred embodiment of a drop-in type shifter of the present invention is illustrated. With specific reference to FIG. 1, the shifter, generally indicated by the numeral 10, comprises an elongate, pivotable shift stick 11 having an upper end 12 and a lower end 13. The upper end 12 is adapted for receiving a handle, illustrated in phantom at 14 in FIG. 1, to facilitate manual actuation of the shift stick. The lower end 13 of the shift stick comprises a lever which is adapted for insertion in an automotive transmission, for changing the drive ratio of the transmission when the shift stick 11 is pivoted. The manner in which the lever 13 changes the drive ratio of the transmission is conventional and is not described herein. It need only be understood that pivoting of the shift lever 11 about first and second orthogonal axes 15 and 16 in the conventional H-shaped pattern illustrated in FIG. 5, creates a pattern of movement for the ball 18, disposed on the end of the shift lever 13, which actuates appropriate linkage disposed within the transmission for changing its drive ratio. A base subassembly 20, separately illustrated in FIG. 9, is provided which is adapted for mounting the shifter on an automotive transmission, not illustrated herein. The base subassembly 20 may, for example, be connected to the transmission with a plurality of bolts which extend through the apertures 21 and into the transmission. A spherical socket 25 is disposed on the base 20. The socket 25 is provided with an aperture 26, disposed on the bottom thereof. A spherical ball 28 is disposed on the shift stick 11. The spherical ball 28 and the shift lever 13 are received in the spherical socket 25. The shift lever 13 extends through the aperture 26 disposed in the bottom of the spherical socket 25 and into the transmission for actuating appropriate shift linkage within the transmission for changing the drive ratio of the transmission when the shift stick is pivoted. A channel 30 is provided which extends through the spherical socket 25. A rocking shaft 31 is provided having first and second ends 32 and 33, which extend from opposing sides of the ball 28 into the channel 30 for stabilizing the pivotable shift stick 11 for pivotable movement about the first and second orthogonal axes 15 and 16. At least one, and preferably a plurality of relatively flat, washer-like springs 40 are provided having central apertures 41 through which the upper end 12 of the shift stick 11 extend. As best illustrated in FIGS. 6 and 7, the washers 40 are provided with a generally curvilinear cross section. A top plate 45 separately illustrated in FIG. 8, is provided which compresses the washer-like springs 40 against the first and second ends 32 and 33 of the rocking shaft 31 for spring biasing the shift stick in an upright fashion.

Figure 1:
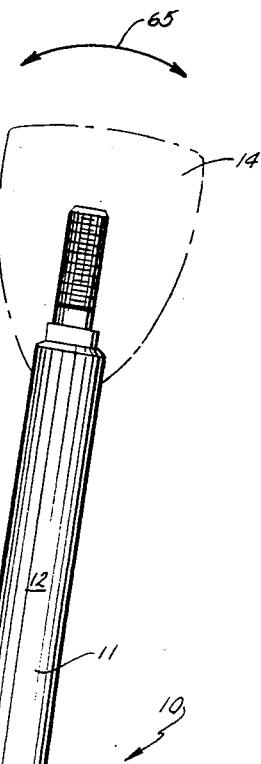
FIG. 1 is a side elevational view, partially in section, of a preferred embodiment of the drop-in type shifter of the present invention.
Figure 1:
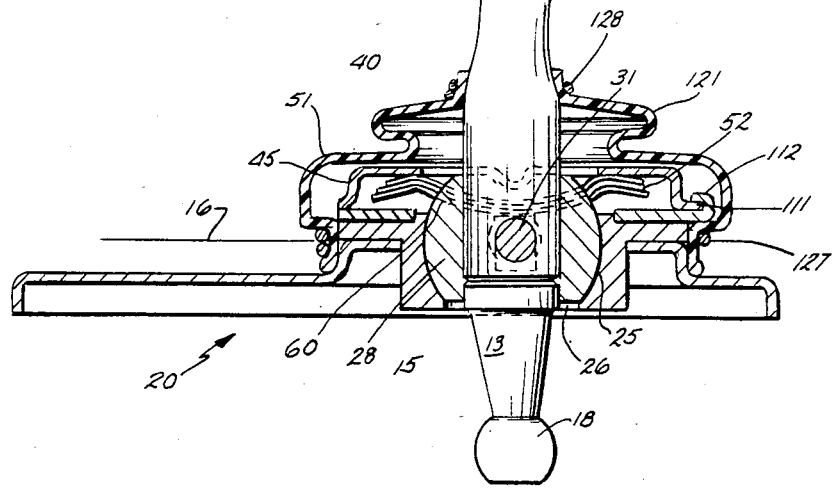
Figure 3:
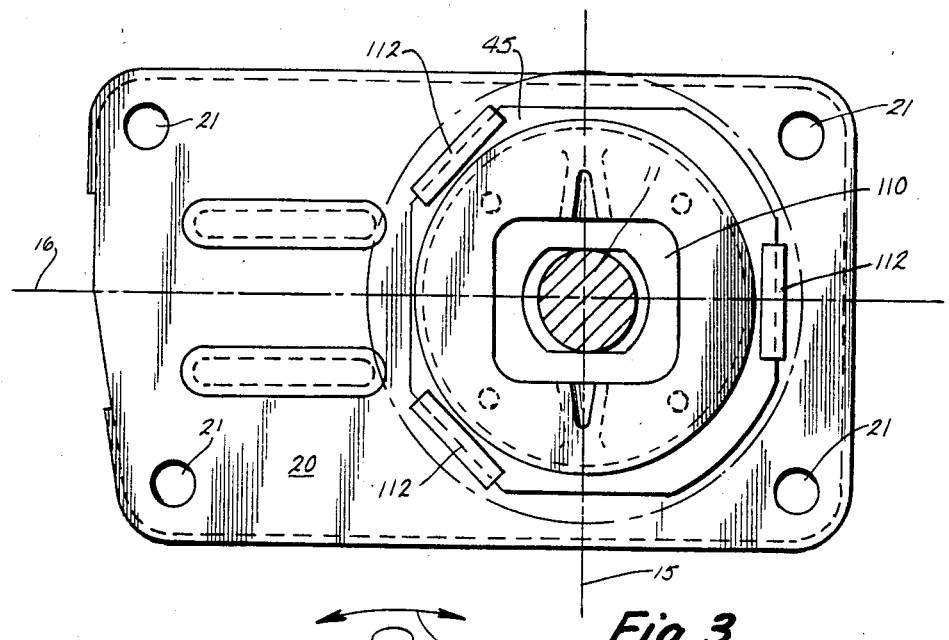
FIG. 3 is a top view, partially in section, of the shifter of FIGS. 1 and 2 with the dust cover illustrated in phantom.
Figure 2:
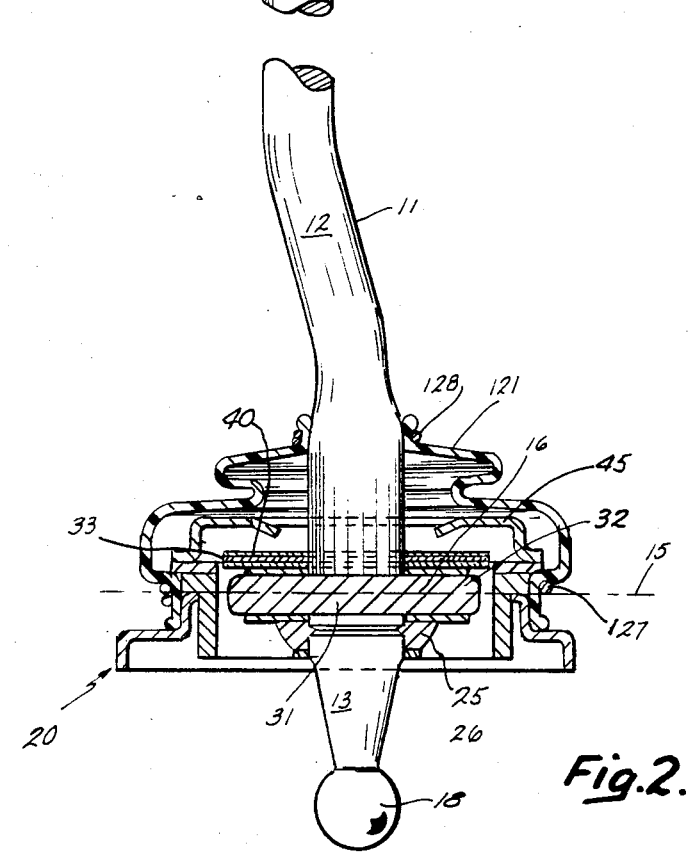
FIG. 2 is a front elevational view, partially in section, of the shifter of FIG. 1.

With particular reference now to FIGS. 6 and 7, it is illustrated that preferably the washer-like springs 40 comprise a portion 50 having an arcuate cross section of relatively constant radius. The washers 40 further include first and second ends 51 and 52 disposed on opposite sides of the portion of arcuate cross section 50. The ends 51 and 52 are relatively flat in cross section, and as best illustrated in FIG. 1, the top plate 45 contacts the ends 51 and 52 of the interleaved springs 40 for compressing the same between the top plate 45 and the ball 28 and rocking shaft 31. The interleaved springs 40 are oriented about the upstanding shift stick 12 such that the curvilinear portions 50 extend or curve downwardly for contact with the first and second ends 32 and 33 of the rocking shaft 31. This spring biases the shift stick 11 into an upright central position about the second orthogonal axis 16, i.e., perpendicular to the base plane of the shifter mounting surface when viewed from the front or rear of the vehicle. With reference now also to FIG. 5, the springs may thus be used to spring bias the shift stick to a central point 55 in the neutral plane whenever the shift stick is pivoted in the direction of the arrows 56 about the second orthogonal axis 16. This pivotal movement of the shift lever 11 is accommodated by rotation between the ball 28 and the socket 25 and relative motion between the first and second ends 32 and 33 of the rocking shaft 31 and the channel 30 of the spherical socket 25.

Figure 4:
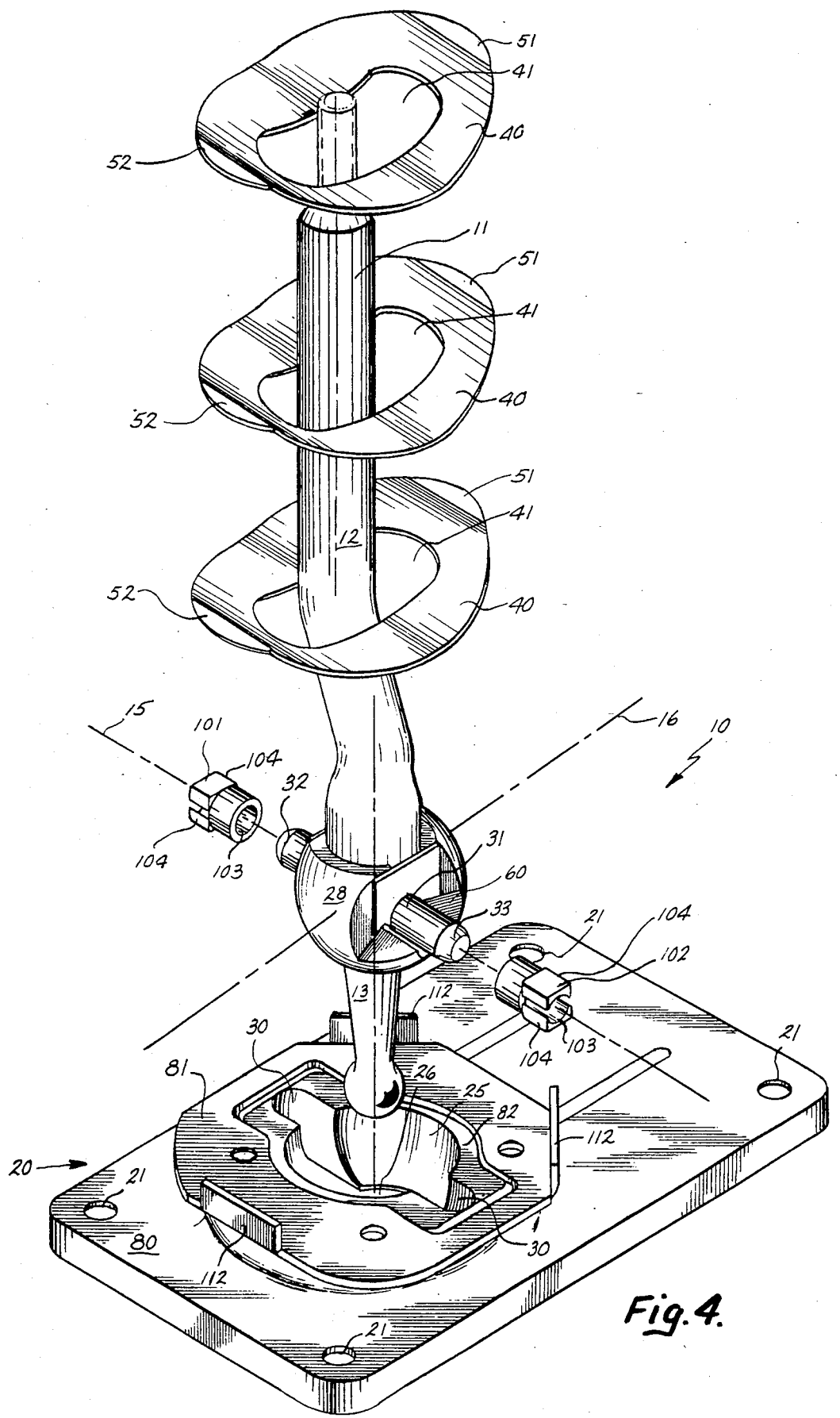
FIG. 4 is an exploded assembly of the shift stick and the ball and socket connection of the drop-in type shifter of the present invention.

As best illustrated in FIGS. 1 and 4, the ball 28 is provided with relieved areas 60 which receive but do not contact the curvilinear portions 50 of the interleaved washers 40. Contact between the curvilinear portions 50 of the washers 40 and the ends of the rocking shaft 31 in FIG. 1, or the surface of the bushings 102 in FIG. 4, spring bias the shift stick 11 into an upright, generally central location about the axis 16.

As best illustrated in FIGS. 6 and 7, the washers 40 may be used to provide a differential spring bias, for example, about the second orthogonal axis 16 by providing different material widths w, or thicknesses t, on opposite sides 70 and 71 of the washers 40.

Assembly of the drop-in type shifter of the present invention is greatly enhanced by the following construction technique. With reference now to FIG. 9, it is illustrated that the base 20 comprises a subassembly which includes a stamped metal lower plate 80, a stamped metal interplate 81, and a molded shifter cup 82 sandwiched therebetween. The stamped metal lower plate 80 includes the apertures 21 which are used to through bolt or otherwise suitably secure the shifter 10 to an automotive transmission. The lower plate 80 includes a platform 84 formed therein for receiving the molded cup 82. The molded cup 82 is provided with the spherical socket 25 and channel 30 molded therein. The platform 84 of the lower plate 80, the inner plate 81 and the molded shifter cup 82 are all provided with an array of apertures 88 which are used to secure the parts together when interfitted with a plurality of rivets 89 or the like. Interfitting of the lower plate 80, the inner plate 81, and the shifter cup 82 in the proper orientation is facilitated by providing the lower plate 80 with an aperture 90 which is sized to permit insertion of a similarly shaped shoulder 91 disposed on the bottom of the shifter cup 82 in one of only two desirable angular orientations. Similarly, the interplate 81 is provided with an aperture 92 which will receive a similarly shaped shoulder 93 disposed on the top of the shifter cup 82 in one of two desirable angular orientations.

With reference now to FIG. 4, it is illustrated that the base subassembly 20 thereafter receives the shift lever 13, the ball 28 and the rocking shaft 31 of the shift stick 11. The lever 13 extends through the aperture 26 in the socket 25 and the ends 32 and 33 of the rocking shaft 31 extend into the channel 30. Preferably, the first and second ends 32 and 33 of the rocking shaft 31 are encompassed by bushings 101 and 102. The bushings 101 and 102 are provided with cylindrical bores 103 to permit relative rotation between the rocking shaft 31 and the bushings about the first orthogonal axis 15. The bushings 101 and 102 are further provided with planar surfaces 104 disposed on opposite sides thereof. The planar surface 104 are parallel and slidably engage the sides of the channel 30 to permit rotation of the shift stick 11 about the second orthogonal axis 16. After the bushings 101 and 104 are inserted over the ends 32 and 33 of the rocking shaft 31 and the ball 28 is seated within the spherical socket 25, one or more, and preferably a plurality, of interleaved washer-like springs 40 are disposed atop the ball 28. The springs 40 include apertures 41 through which the upright shift stick 11 and top portion of the spherical ball extends. The obround-shaped central apertures in the springs match the shape of the pivot ball to prevent rotation of the springs. If the springs were permitted to rotate, spring biasing would be lost. Thereafter, a top plate 45 separately illustrated in FIG. 8, is urged downwardly over the interleaved springs 40. The upright shift stick 11 is received in a central aperture 110 disposed in the top plate 45. The top plate 45 is provided with a peripheral flange 111, and the inner plate 81 is provided with a plurality of deformable tabs 112 which are bent around the flange 111 to secure the top plate 45 to the assembly, as best illustrated in FIG. 1. The proper angular orientation of the top plate 45 and the inner plate 81 is insured through the interaction of angular surfaces such as the surface 120 on top plate 45 and the inner surfaces of the deformable tabs 112. Assembly of the shifter 10 is completed when a dust cover or boot 121, best illustrated in FIG. 8, is added. The lower portion of the dust cover 121 is provided with a circular opening which is received over a cylindrical portion 126, formed in the top plate 45. The lower portion of the dust cover 121 is clamped to the cylindrical surface 145 with a compression ring 127. Similarly, the upper portion 12 of the shift stick 11 extends through an aperture disposed in the top of the dust cover 121 and is clamped thereto with a compression ring 128.

Figures 17, 18:
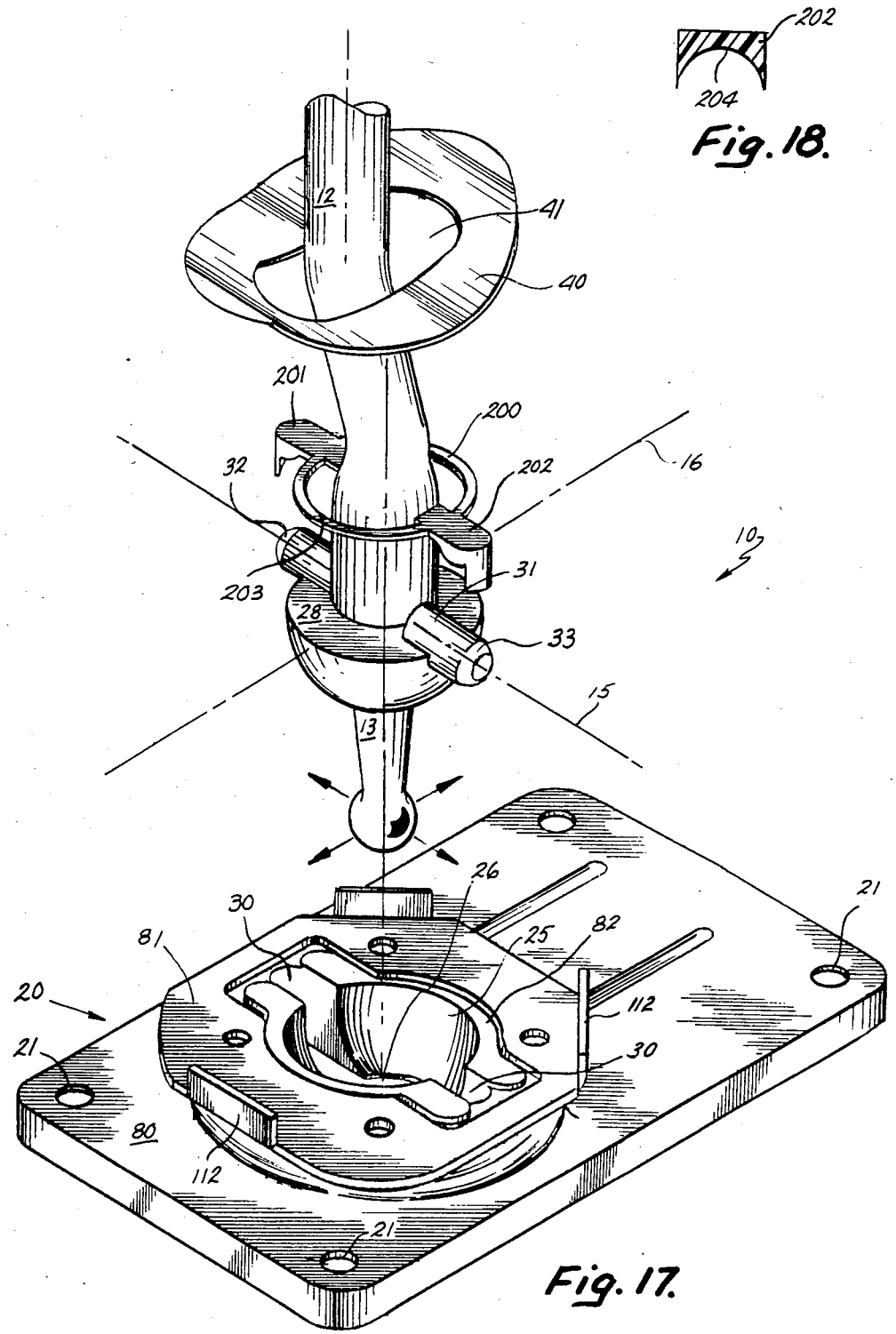
FIG. 17 is an exploded assembly of another embodiment of the shift stick and ball and socket connection of the drop-in-type shifter of the present invention.
FIG. 18 is a sectional view of one end of a part which covers the rocking shaft of the drop-in-type shifter of the present invention.

FIG. 17 illustrates an embodiment of the invention featuring an improved construction for the ball 28 and the bushings 101 and 102 which encompass opposing ends of the rocking shaft 31 in FIG. 4. In the embodiment of FIG. 17, the ball 28 is provided with a hemispherical shape that is molded from a high impact strength polymeric material such as fiberglass filled nylon. The rocking shaft 31 is press fit into an aperture provided in shift stick 12. Thereafter, the molded plastic socket 28 is press fit over the lever 13 until it seals in abutting relationship with the rocking shaft 31. Rocking shaft covering part 200 is then dropped over the ends of the rocking shaft 31 and assembly is continued as previously described beginning with the addition of the flat springs 40. The rocking shaft covering part 200 is also molded from a material such as nylon and comprises first and second ends 201 and 202 interconnected by ring 203. The lower surfaces 204 of the first and second ends 201 and 202, separately illustrated in FIG. 18, are provided with a generally cylindrical shape that forms a bearing surface against which the rocking shaft 31 is free to rotate about axis 15. The sides of the first and second ends 201 and 202 slidably engage the walls of channel 30 that bisects the socket 25 to provide for rocking of the shaft 31 and pivoting of the stick 12 about axis 16.

FIGS. 10 and 11 are provided to be illustrative of prior art spring biasing techniques for drop-in type shifters employing a yoke 130 and a plurality of coil springs 131.

FIG. 12 illustrates an embodiment of the invention wherein at least one washer 40 is provided which comprises two pairs of downwardly directed, curvilinear cross sections disposed at 140 and 141. The curvilinear sections disposed at 140 engage the ends of the rocking shaft 31 and the curvilinear sections disposed at 141 engage seats 60 disposed on opposing sides of the ball 28.

Figure 13:
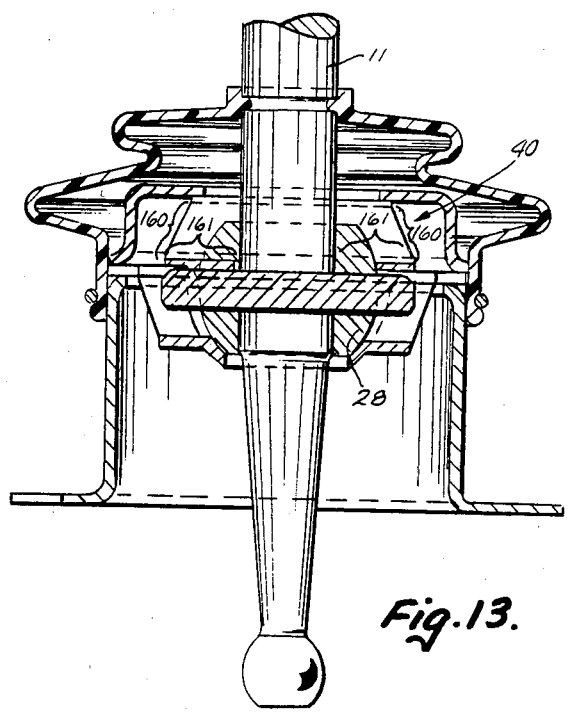
FIG. 13 is a side elevational view, partially in section, of another embodiment of the drop-in type shifter of the present invention.
Figure 14:
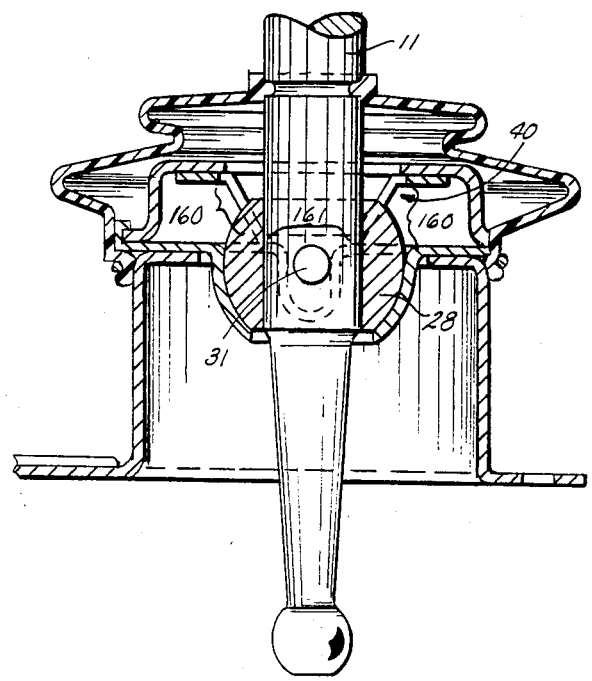
FIG. 14 is a front elevational view, taken in section, of the drop-in type shifter illustrated in FIG. 13.

FIGS. 13 and 14 illustrate embodiments of the invention wherein the flat spring 40 comprises a plurality of linear segments 160 and 161. The segments 161 contact the rocking shaft 31 for spring biasing the shift lever 11 about the ball 28 in an upright fashion.

Figure 15:
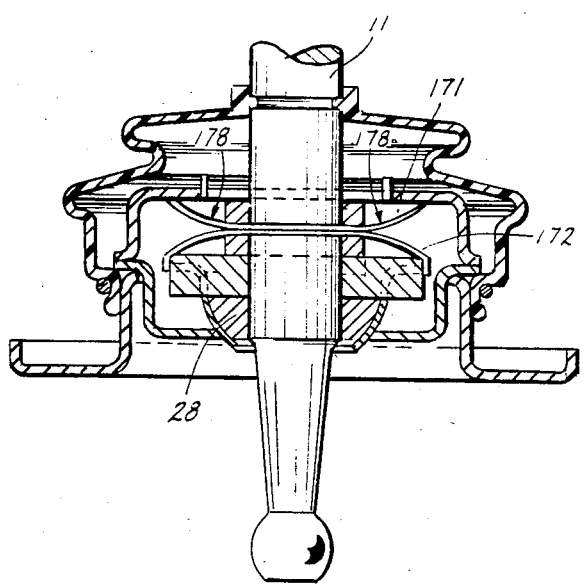
FIG. 15 is a side elevational view, taken in section, of another embodiment of the drop-in type shifter of the present invention.
Figure 16:
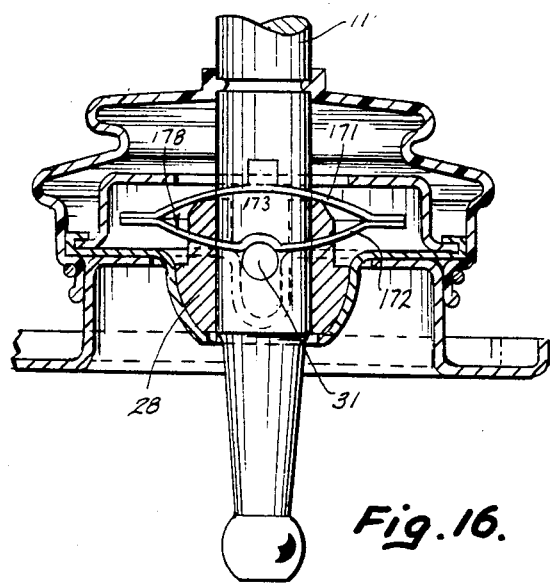
FIG. 16 is a front elevational view, taken in section, of the embodiment of the invention illustrated in FIG. 15.

FIGS. 15 and 16 illustrate embodiments of the invention wherein top and lower washer-like springs 171 and 172 are provided with matching curvilinear cross sections. The springs 171 and 172 are disposed one atop the other in a mirror-like relationship. Section 173 of the lower spring 172 contacts the rocking shaft 31 for spring biasing the same about one of the two orthogonal axes.

The above description should be considered as exemplary and that of the preferred embodiments only. These and other modifications of the invention will occur to those who make and use the invention. The true scope and spirit of the present invention is to be determined by reference to the appended claims.

The embodiments of the invention in which an exclusive property or privilege is claimed are defined as follows:

1. A shifter for an automotive transmission comprising:
   an elongate, pivotable shift stick having an upper end and a lower end, said upper end being manually actuable and said lower end having means for changing the drive ratio of the transmission when said shift stick is pivoted;
   a base adapted for mounting said shifter on the transmission;
   a spherical socket disposed on said base;
   a spherical ball disposed on said shift stick, said ball being received in said socket for pivotally mounting said shift stick on said base;
   a relatively flat washer-like spring having a central opening through which said upper end of said shift stick extends; and
   means for compressing said washer-like spring toward said ball, said washer-like spring having a generally curvilinear cross section for spring biasing said shift stick in an upright fashion.

2. The shifter of claim 1 wherein a plurality of interleaved washer-like springs are provided.

3. The shifter of claim 1 wherein portions of said spring are provided with different material dimensions to provide for a differential spring bias.

4. The shifter of claim 1 wherein top and lower washer-like springs are provided, said top spring being provided with generally curvilinear cross section and said lower spring being provided with a matching generally curvilinear cross section, said top and lower springs being disposed one atop the other, one spring oriented as the mirror image of the other, between said ball and said means for compressing.

5. The shifter of claim 1 wherein said shifter further comprises:
   a channel extending through said socket; and
   a rocking shaft having first and second ends disposed on said ball, said first and second ends extending into said channel for stabilizing said pivotable shift stick for pivotable movement about first and second orthogonal axes.

6. The shifter of claim 5 wherein said first and second ends of said rocking shaft are provided with first and second bushings having cylindrical cores for receiving said rocking shaft and planar surfaces for slidably engaging said channel.

7. The shifter of claim 5 wherein a substantial portion of said washer-like spring is provided with an arcuate cross section of relatively constant radius.

8. The shifter of claim 5 wherein said washer-like spring is provided with first and second ends with sections having a generally curvilinear cross section disposed therebetween.

9. The shifter of claim 8 wherein said ball is provided with a seat for receiving a portion of said sections of curvilinear cross section for spring biasing said shift stick into an upright central location about one of said first and second orthogonal axes.

10. The shifter of claim 8 wherein said sections of generally curvilinear cross section are comprised of a plurality of linear segments.

11. The shifter of claim 8 wherein said sections of curvilinear cross section curve downwardly for achieving contact with said first and second ends of said rocking shaft and spring biasing said shift stick into an upright central location about one of said first and second orthogonal axes.

12. The shifter of claim 11 wherein said first and second ends are also provided with downwardly directed curvilinear sections and said ball is provided with seats for receiving said downwardly directed curvilinear sections of said first and second ends for spring biasing said shift stick into an upright central location about the other of said first and second orthogonal axes.

13. The shifter of claim 8 wherein said means for compressing said washer-like spring against said ball comprises a top plate having a central aperture through which said shift stick extends, said top plate being secured to said base.

14. The shifter of claim 13 wherein said base comprises a stamped metal lower plate adapted for mounting on an automotive transmission; a molded shifter cup containing said socket, said cup being mounted on said lower plate; and an inner plate disposed atop said cup.

15. The shifter of claim 14 wherein said inner plate is provided with a plurality of deformable tabs for at least partially encompassing and securing said top plate to said base.

16. A drop-in type shifter for an automotive transmission comprising:
   an elongate pivotable shaft stick having an upper end and a lower end, said upper end being manually actuable and said lower end having a lever adapted for insertion in an automotive transmission for changing the drive ratio of the transmission when said shift stick is pivoted;
   a base adapted for mounting said shifter on the transmission;
   a spherical socket disposed on said base;
   a spherical ball disposed on said shift stick between said upper end and said lever, said ball and said lever being received in said socket for pivotally mounting said shift stick on said base, said lever extending through said socket into the transmission;
   a channel extending through said socket;
   a rocking shaft having first and second ends disposed on said ball, said first and second ends extending into said channel for stabilizing said pivotable shift stick for pivotal movement about first and second orthogonal axes;
   a relatively flat washer-like spring having a central opening through which said upper end of said shift stick extends; and
   means for compressing said washer-like spring against said first and second ends of said rocking shaft, said washer-like spring having a generally curvilinear cross section for spring biasing said shift stick in an upright fashion.

17. The drop-in type shifter of claim 16 wherein portions of said spring are provided with different material dimensions to provide for a differential spring bias.

18. The drop-in type shifter of claim 16 wherein said first and second ends of said rocking shaft are provided with first and second bushings having cylindrical bores for receiving said rocking shaft and planar surfaces for slidably engaging said channel.

19. The drop-in type shifter of claim 16 wherein said ball is provided with a hemispherical shape and said first and second ends of said rocking shaft are provided with first and second covering parts interconnected by a ring-shaped member, said first and second covering parts having a generally cylindrical lower bearing surface for partially encompassing said first and second ends of said rocking shaft, respectively, the sides of said first and second covering parts slidably engaging said channel.

20. The drop-in type shifter of claim 16 wherein a substantial portion of said washer-like spring is provided with an arcuate cross section of relatively constant radius.

21. The drop-in type shifter of claim 16 wherein said washer-like spring is provided with first and second ends with sections having a generally curvilinear cross section disposed therebetween.

22. The drop-in type shifter of claim 21 wherein said means for compressing said washer-like spring against said ball comprises a top plate having a central aperture through which said shift stick extends, said top plate being secured to said base.

23. The drop-in type shifter of claim 22 wherein said base comprises a stamped metal member adapted for mounting on an automotive transmission; a molded shifter cup containing said socket, said cup being mounted on said stamped metal member; and an inner plate disposed atop said cup.

24. The drop-in type shifter of claim 23 wherein said inner plate is provided with a plurality of deformable tabs for at least partially encompassing and securing said top plate to said base.

25. The drop-in type shifter of claim 21 wherein said sections of curvilinear cross section curve downwardly for achieving contact with said first and second ends of said rocking shaft and spring biasing said shift stick into an upright central location about one of said first and second orthogonal axes.

26. The drop-in type shifter of claim 25 wherein said ball is provided with a seat for receiving a portion of said sections of curvilinear cross section for spring biasing said shift stick into an upright central location about the other of said first and second orthogonal axes.

27. The drop-in type shifter of claim 26 wherein a plurality of interleaved washer-like springs are provided.

* * * * *